United States Patent
Zhou et al.

(10) Patent No.: US 11,629,994 B1
(45) Date of Patent: Apr. 18, 2023

(54) METHOD FOR DETECTING AMBIENT LIGHT SENSING VALUE, ELECTRONIC DEVICE AND STORAGE MEDIUM

(71) Applicant: SHENZHEN GOODIX TECHNOLOGY CO., LTD., Shenzhen (CN)

(72) Inventors: Luming Zhou, Shenzhen (CN); Xiangyu Yang, Shenzhen (CN); Siqiu Cheng, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/700,939

(22) Filed: Mar. 22, 2022

(30) Foreign Application Priority Data

Sep. 30, 2021 (CN) .......................... 202111162794.8

(51) Int. Cl.
*G01J 1/42* (2006.01)
*G09G 5/10* (2006.01)
*G09G 3/34* (2006.01)

(52) U.S. Cl.
CPC .......... *G01J 1/4204* (2013.01); *G09G 3/3406* (2013.01); *G09G 5/10* (2013.01);
(Continued)

(58) Field of Classification Search
CPC ....... G01J 1/4204; G09G 3/3406; G09G 5/10; G09G 2320/0626; G09G 2360/144
See application file for complete search history.

(56) References Cited

U.S. PATENT DOCUMENTS 11,482,167 B1 * 10/2022 Kuang ................. G09G 3/3208
2016/0307485 A1 * 10/2016 Ma ........................... G09G 3/20
(Continued)

FOREIGN PATENT DOCUMENTS

| CN | 106969832 B | 4/2018 |
| CN | 111829654 A | 10/2020 |

(Continued)

OTHER PUBLICATIONS

Office Action in Chinese Application No. 2022051702393690 dated May 20, 2022, 13 pages (with English Translation).
(Continued)

*Primary Examiner* — Antonio Xavier
(74) *Attorney, Agent, or Firm* — W&G Law Group

(57) ABSTRACT

Embodiments of the present disclosure disclose a method for detecting ambient light sensing value, an electronic device and a storage medium. The method includes: collecting a light sensing value when a display screen is in an on state, to obtain a first light sensing value; collecting a light sensing value when the display screen is in an off state, to obtain a second light sensing value; calculating a difference between the first light sensing value and the second light sensing value, to obtain a light sensing value drop depth; acquiring a first calibration coefficient or a second calibration coefficient; calculating the ambient light sensing value based on the first light sensing value, the light sensing value drop depth and the first calibration coefficient; or calculating the ambient light sensing value based on the second light sensing value, the light sensing value drop depth and the second calibration coefficient.

20 Claims, 2 Drawing Sheets

(52) U.S. Cl.
CPC ............... *G09G 2320/0626* (2013.01); *G09G 2360/144* (2013.01)

(56) References Cited

U.S. PATENT DOCUMENTS

| | | | |
|---|---|---|---|
| 2021/0210027 A1* | 7/2021 | Chen | G01J 1/4204 |
| 2022/0171494 A1* | 6/2022 | Shih | G09G 3/20 |
| 2022/0260414 A1* | 8/2022 | Wu | G01J 1/08 |
| 2022/0301519 A1* | 9/2022 | Greimel-Laengauer | G09G 5/10 |

FOREIGN PATENT DOCUMENTS

| | | |
|---|---|---|
| CN | 112599088 A | 4/2021 |
| CN | 113077738 A | 7/2021 |
| WO | 2020025612 A1 | 2/2020 |
| WO | 2020074696 A1 | 4/2020 |
| WO | 2021110745 A1 | 6/2021 |

OTHER PUBLICATIONS

Extended Search Report in European Application No. 22163883.6 dated Aug. 22, 2022, 10 pages.
Office Action in Chinese Application No. 202111162794.8 dated Jul. 29, 2022, 15 pages (with English Translation).

* cited by examiner

METHOD FOR DETECTING AMBIENT LIGHT SENSING VALUE, ELECTRONIC DEVICE AND STORAGE MEDIUM

CROSS-REFERENCE TO RELATED APPLICATIONS

The present application claims priority to Chinese Patent Application No. 202111162794.8, filed on Sep. 30, 2021, the content of which is incorporated herein by reference in its entirety.

TECHNICAL FIELD

Embodiments of the present disclosure relate to the field of terminal detection technologies and, in particular, to a method for detecting ambient light sensing value, an electronic device and a storage medium.

BACKGROUND

With the continuous development of display technologies and the increasing requirements of the users, sizes of display screens of mobile electronic devices such as mobile phones are becoming larger and larger. The pursuit of a higher screen-to-body ratio has become a developing trend of the current mobile phone market. In order to meet this requirement, research has been conducted on how to place sensors, which are generally located on front surfaces of mobile phones and on a same layer as display screens, below the display screens. The sensors also include ambient light sensors. The ambient light sensor is configured to detect intensity of ambient light. The mobile phone may adaptively adjust brightness of the screen according to the intensity of the ambient light detected, so that human eyes are comfortable with the brightness of the screen in a current environment.

However, since self-luminous screens (such as OLED screens) are increasingly used as the display screens of the mobile electronic devices such as mobile phones, the ambient light sensor may sense light leakage of the display screen while detecting ambient light. The light leakage of the display screen may affect the detection accuracy of ambient light sensing values. In the related art, a common method to solve this problem is to acquire display content of the screen of the mobile phone and estimate a sensing value of the ambient light sensor to the display content of the screen. Finally, an actual ambient light sensing value is obtained by subtracting the sensing value to the display content of the screen from the sensing value detected by the ambient light sensor.

However, the above method requires real-time and high-frequency capturing of the display content of the screen, which brings heavy load for mobile phones, and may also involve personal privacy and information security issues. In addition, the screenshot action may also cause large power consumption, and it is impossible to capture the changing display content in real time especially when the display content is switched quickly.

SUMMARY

Embodiments of the present disclosure provide a method for detecting ambient light sensing value, an electronic device and a storage medium, which can effectively reduce the influence of light leakage of the display screen on ambient light detection and improve the accuracy of ambient light detection.

In a first aspect, embodiments of the present disclosure provide a method for detecting ambient light sensing value, applied to an electronic device including a display screen and a sensor located below the display screen. The method includes: collecting a light sensing value sensed by the sensor when the display screen is in an on state, to obtain a first light sensing value; the first light sensing value is a sum of the ambient light sensing value and a first screen light leakage value, and the first screen light leakage value is a light leakage value when the display screen is in the on state; collecting a light sensing value sensed by the sensor when the display screen is in an off state, to obtain a second light sensing value; the second light sensing value is a sum of the ambient light sensing value and a second screen light leakage value, and the second screen light leakage value is a light leakage value when the display screen is in the off state; calculating a difference between the first light sensing value and the second light sensing value, to obtain a light sensing value drop depth; acquiring a first calibration coefficient or a second calibration coefficient; and calculating the ambient light sensing value based on the first light sensing value, the light sensing value drop depth and the first calibration coefficient; or calculating the ambient light sensing value based on the second light sensing value, the light sensing value drop depth and the second calibration coefficient. The first calibration coefficient is configured to calibrate a mapping relationship between the light sensing value drop depth and the first screen light leakage value to obtain a calibrated first screen light leakage value; and the second calibration coefficient is configured to calibrate a mapping relationship between the light sensing value drop depth and the second screen light leakage value to obtain a calibrated second screen light leakage value.

In the method for detecting ambient light sensing value according to the embodiments of the present disclosure, a light sensing value drop depth and a first calibration coefficient or a second calibration coefficient are acquired, so that a light leakage value of the display screen can be accurately acquired, thereby effectively eliminating the influence of light leakage of the display screen on ambient light detection and improving the detection accuracy of ambient light sensing values.

In some embodiments, said acquiring a first calibration coefficient or a second calibration coefficient further includes: fixing a grayscale value of the display screen, and respectively acquiring the light sensing value drop depths and the first screen light leakage values under at least two different brightness values of the display screen, to obtain the first calibration coefficient by fitting; or fixing a grayscale value of the display screen, and respectively acquiring the light sensing value drop depths and the second screen light leakage values under at least two different brightness values of the display screen, to obtain the second calibration coefficient by fitting.

In some embodiments, said acquiring a first calibration coefficient or a second calibration coefficient further includes: fixing a brightness value of the display screen, and respectively acquiring the light sensing value drop depths and the first screen light leakage values under at least two different grayscale values of the display screen, to obtain the first calibration coefficient by fitting; or fixing a brightness value of the display screen, and respectively acquiring the light sensing value drop depths and the second screen light leakage values under at least two different grayscale values of the display screen, to obtain the second calibration coefficient by fitting.

In some embodiments, said calculating the ambient light sensing value based on the first light sensing value, the light sensing value drop depth and the first calibration coefficient further includes: obtaining the ambient light sensing value by subtracting the calibrated first screen light leakage value from the first light sensing value. The calibrated first screen light leakage value is equal to a product of the light sensing value drop depth and the first calibration coefficient.

In some embodiments, said calculating the ambient light sensing value based on the second light sensing value, the light sensing value drop depth and the second calibration coefficient further includes: obtaining the ambient light sensing value by subtracting the calibrated second screen light leakage value from the second light sensing value. The calibrated second screen light leakage value is equal to a product of the light sensing value drop depth and the second calibration coefficient.

In some embodiments, the first light sensing value and the second light sensing value are collected respectively within a dimming cycle of the display screen; and the dimming cycle of the display screen includes: a non-drop period during which the display screen is on and a drop period during which the display screen is off.

In some embodiments, collection of the first light sensing value and the second light sensing value is triggered based on vertical synchronization (VSync) signals of the display screen.

In some embodiments, a signal cycle of each of the VSync signals includes at least one dimming cycle of the display screen.

In some embodiments, at least one ambient light sensing value is obtained by triggering each of the VSync signals.

In some embodiments, the method further includes: superimposing the ambient light sensing values corresponding to at least two of the VSync signals, and calculating an average ambient light sensing value.

In a second aspect, embodiments of the present disclosure provide an electronic device, including: a display screen, a sensor located below the display screen and configured to sense a light sensing value, a memory configured to store computer execution instructions; and a processor configured to execute the computer execution instructions stored in the memory. When the computer execution instructions are executed, the processor is configured to perform the method for detecting ambient light sensing value as described in the first aspect.

In a third aspect, embodiments of the present disclosure provide a computer-readable storage medium storing computer execution instructions thereon. The computer execution instructions are executed by a processor to perform the method for detecting ambient light sensing value as described in the first aspect.

BRIEF DESCRIPTION OF DRAWINGS

One or more embodiments are exemplarily described with reference to figures in the accompanying drawings. The exemplary descriptions do not constitute limitations on the embodiments. When the following description involves the accompanying drawings, elements with same reference signs in different accompanying drawings indicate same or similar elements. Unless otherwise particularly stated, the figures in the accompanying drawings do not constitute a scale limitation.

DESCRIPTION OF EMBODIMENTS

The technical solutions in the embodiments of the present disclosure will be described clearly and completely below with reference to the accompanying drawings. It is appreciated that, the embodiments described are some of rather than all of the embodiments of the present disclosure.

The terms used herein in the present disclosure are only for the purpose of describing specific embodiments, and are not intended to limit the present disclosure. As used in the present disclosure and the appended claims, the singular forms of "a/an", "the", and "said" are intended to also include plural forms, unless otherwise clearly specified by the context. It is to be further understood that the term "and/or" used herein refers to and includes any or all possible combinations of one or more of relevant listed items.

Unless the order specified is clearly stated in the context of the present disclosure, the processing steps described herein may be performed differently from the order specified. That is, each step may be executed in a specified order, each step may be executed essentially simultaneously, each step may be executed in reverse order, or each step may be executed in a different order.

In addition, the terms such as "first" and "second" are used for distinguishing similar objects only, which cannot be construed as indicating or implying a relative importance, or implicitly specifying the number of the indicated technical features. Thus, the features defined with "first" and "second" may explicitly or implicitly include one or more features.

An embodiment of the present disclosure provides a method for detecting ambient light sensing value, applied to an electronic device 10. The electronic device 10 includes a display screen 101 and a sensor 102 located below the display screen 101. The sensor 102 may be configured to sense light sensing values. The electronic device 10 may be a mobile device such as a mobile phone or a tablet computer.

The method for detecting ambient light sensing value according to the embodiments of the present disclosure is described below with reference to FIG. 2 to FIG. 5.

Figure 1:
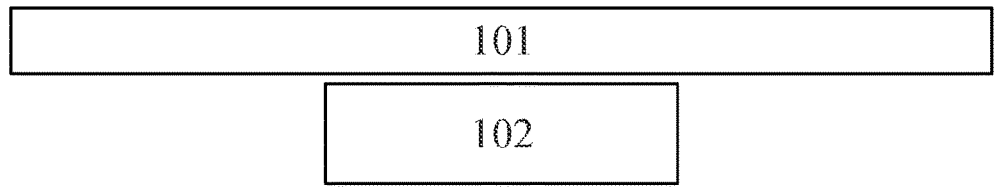
FIG. 1 is a schematic diagram showing position relationship between a display screen and a sensor according to an embodiment of the present disclosure.
Figure 2:
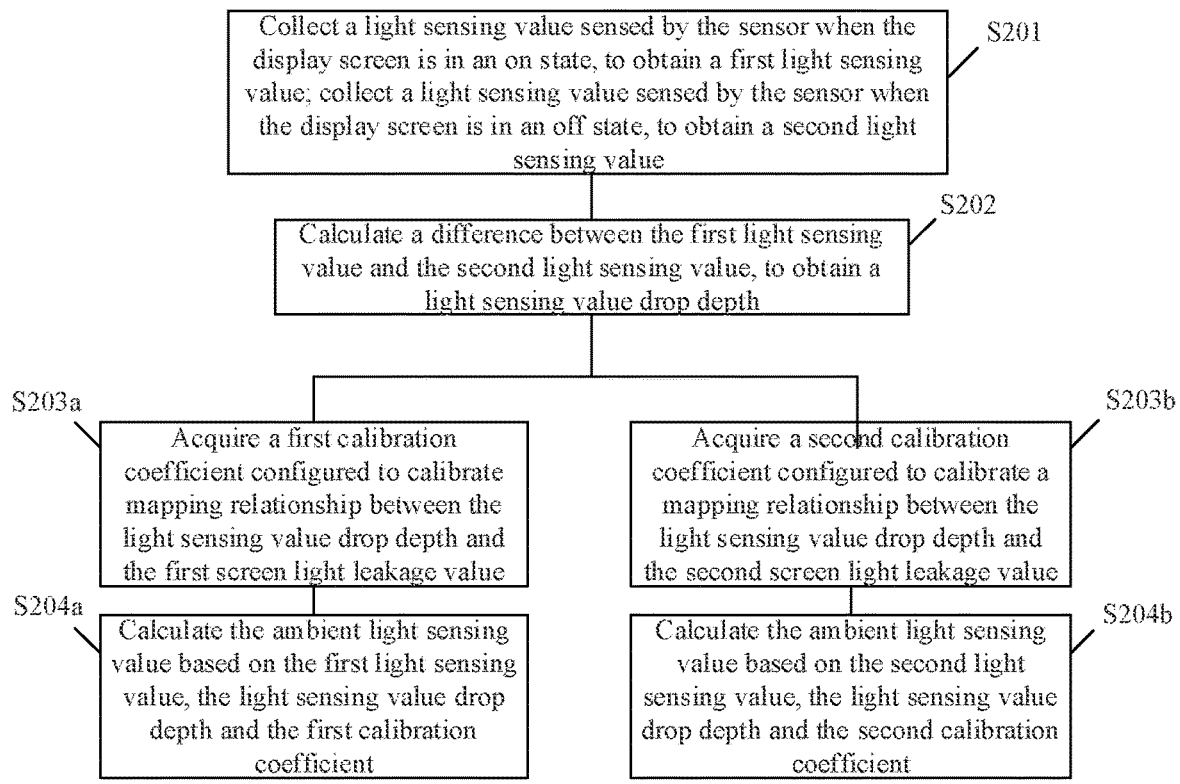
FIG. 2 is a schematic flowchart of a method for detecting ambient light sensing value according to an embodiment of the present disclosure.

As shown in FIG. 2 which is a schematic flowchart of a method for detecting ambient light sensing value according to an embodiment of the present disclosure, the method specifically includes the following steps.

In step S201, a light sensing value sensed by the sensor 102 when the display screen 101 is in an on state is collected, to obtain a first light sensing value Rawdata1; and a light sensing value sensed by the sensor 102 when the display screen 101 is in an off state is collected, to obtain a second light sensing value Rawdata2.

The first light sensing value Rawdata1 and the second light sensing value Rawdata2 are ambient light sensing values sensed by the sensor when the display screen is in the on state and the off state, respectively. However, the ambient light sensing value includes an actual ambient light sensing value and also a light leakage value of the display screen. Light leakage of the display screen refers to light emitted from a back surface of a self-luminous display screen (such as an OLED screen), which is incident into a photosensitive region of the sensor together with ambient light. As a result, the sensor cannot accurately detect the actual ambient light sensing value. Therefore, in order to improve the accuracy of ambient light detection, there is a need to accurately acquire the light leakage value of the display screen.

The first light sensing value Rawdata1 is a sum of the actual ambient light sensing value A and a first screen light leakage value $L_1$. The first screen light leakage value $L_1$ is a light leakage value when the display screen is in the on state. The second light sensing value Rawdata2 is a sum of the actual ambient light sensing value A and a second screen light leakage value $L_2$. The second screen light leakage value $L_2$ is a light leakage value when the display screen is in the off state.

The operation of collecting the first light sensing value Rawdata1 and the second light sensing value Rawdata2 may be triggered by a VSync signal. The VSync signal may be configured to represent a synchronization signal for refreshing screen content. For example, the VSync signal has a specified frequency at which the display screen may refresh the content on the display screen (for example, the content may be content of a frame of image). That is, when the VSync signal is received and the content currently displayed on the display screen is refreshed, a collection operation may be triggered. A corresponding ambient light sensing value may be correspondingly obtained by triggering each VSync signal.

In addition, the collection operation may be collecting corresponding light sensing values within a dimming cycle of the display screen. For example, a dimming manner may be pulse width modulation (PWM) dimming or direct current (DC) dimming, which is not limited in embodiments of the present disclosure. In order to clearly describe the technical solution of the present disclosure, the technical solution of the present disclosure is described below by taking PWM dimming as an example.

PWM dimming refers to adjusting the brightness of the display screen by adjusting a duty cycle and a driving voltage of a driving signal of the display screen. In the case of PWM dimming, the "on" display screen is not continuously luminous, but is turned on and turned off continuously and alternately. When the display screen is alternately turned on and turned off fast enough, it may be considered by naked eyes that the display screen is luminous all the time. Within a dimming cycle of a display screen driving waveform, a time period when the display screen is in the on state is called a non-drop zone, and a time period when the display screen is in the off state is called a drop zone.

It may be understood that, in the case of PWM dimming, in the drop zone, there is one situation that the circuit is completely turned off, but the display screen still has afterglow due to physical properties of the screen device or a short time of complete turn-off of the circuit. In another situation, the circuit is not completely turned off, so that the display screen is still luminous with low brightness, resulting in a fact that the light sensing value collected in the drop zone may also include a certain size of light leakage of the display screen.

Therefore, it is to be particularly noted that, in the embodiments of the present disclosure, the display screen being in the off state may mean the display screen being in a completely off state, that is, the display screen does not emit light, but due to the fact that the display screen is completely turned off for a very short time, the sensor may still detect light leakage of the display screen within this time period. Alternatively, the display screen being in the off state may refer to that the display screen is luminous with low brightness. The low brightness is at least lower than the brightness of the display screen in the non-drop zone. Moreover, the light sensing value sensed by the sensor may be chosen to be sampled at a time point when the luminance of the display screen is the lowest, so as to minimize the light leakage of the display screen.

Figure 3:
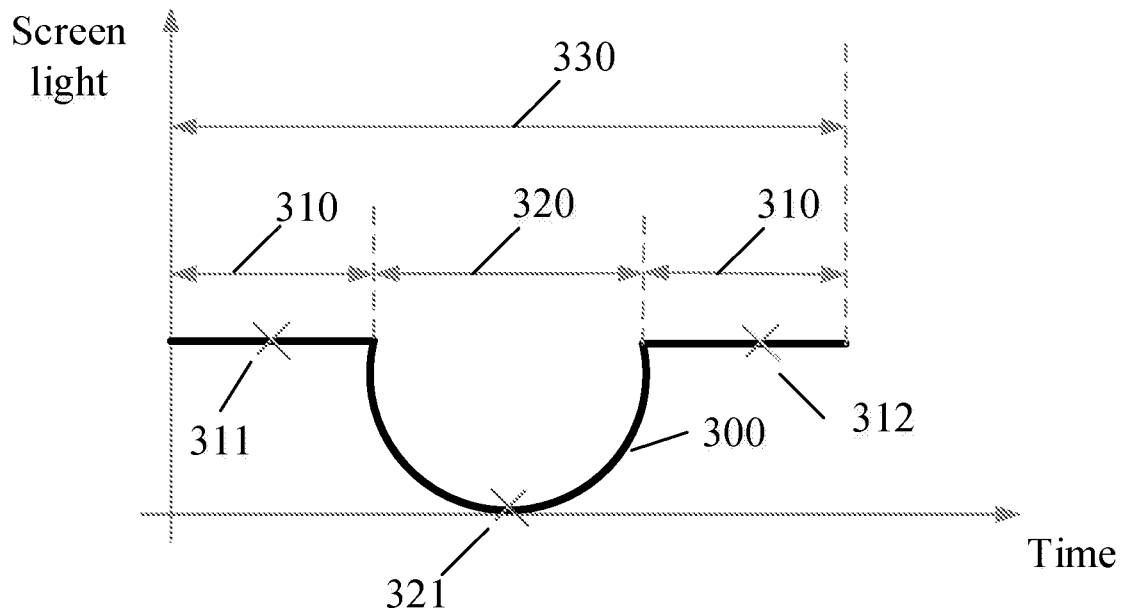
FIG. 3 is a schematic diagram of a display screen driving waveform corresponding to a VSync signal according to an embodiment of the present disclosure.

In some embodiments, FIG. 3 is a schematic diagram of a display screen driving waveform corresponding to a VSync signal according to an embodiment of the present disclosure. A signal cycle 330 of a VSync signal is equal to a dimming cycle 300 of the display screen. The dimming cycle 300 of the display screen includes: a non-drop zone 310 and a drop zone 320. When the VSync signal is detected and then the collection operation is triggered, a light sensing value sensed by the sensor may be sampled at a time point corresponding to a sampling point 311 or a sampling point 312 in the non-drop zone 310 to obtain the first light sensing value Rawdata1, or light sensing values collected by the sensor at the time points corresponding to the sampling point 311 or the sampling point 312 may be superimposed and averaged, to obtain the first light sensing value Rawdata1. A light sensing value sensed by the sensor at a time point corresponding to a sampling point 321 in the drop zone 320, to obtain the second light sensing value Rawdata2.

Figure 4:
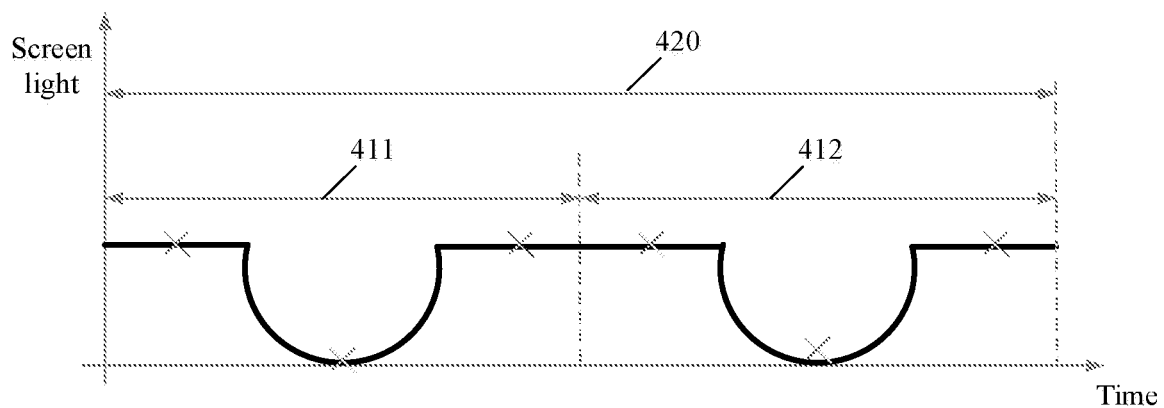
FIG. 4 is a schematic diagram of another display screen driving waveform corresponding to a VSync signal according to an embodiment of the present disclosure.

In some embodiments, a signal cycle of each of the VSync signals includes two or more dimming cycles of the display screen. FIG. 4 is a schematic diagram of another display screen driving waveform corresponding to a VSync signal according to an embodiment of the present disclosure. A signal cycle 420 of a VSync signal corresponds to two dimming cycles (i.e., a dimming cycle 411 and a dimming cycle 412) of the display screen. The dimming cycle 411 and the dimming cycle 412 each include non-drop zones and drop zones. Therefore, light sensing values corresponding to sampling points in all the non-drop zones within the signal cycle 420 of a VSync signal may be superimposed and averaged, to serve as the first light sensing value Rawdata1, and light sensing values corresponding to sampling points in all the drop zones within the signal cycle 420 of a VSync signal are superimposed and averaged, to serve as the second light sensing value Rawdata2.

In step S202, a difference between the first light sensing value Rawdata1 and the second light sensing value Rawdata2 is calculated, to obtain a light sensing value drop depth Raw_depth.

After the first light sensing value Rawdata1 and the second light sensing value Rawdata2 are acquired, the light sensing value drop depth Raw_depth may be obtained by calculating a difference between the two, that is, Raw_depth=Rawdata1−Rawdata2.

In step S203*a*, a first calibration coefficient $k_1$ is acquired. The first calibration coefficient $k_1$ may be configured to calibrate a mapping relationship between the light sensing value drop depth Raw_depth and the first screen light leakage value $L_1$ to obtain the calibrated first screen light leakage value $L_1'$.

The first calibration coefficient may be pre-determined with a calibration method. The mapping relationship between the light sensing value drop depth and the first screen light leakage value may be a linear relationship or a polynomial relationship, or represented in a form of a matrix or a lookup table.

In some embodiments, a grayscale value of the display screen is fixed, and under at least two different brightness values of the display screen, the light sensing value drop depths and the first screen light leakage values are correspondingly acquired respectively, to obtain the first calibration coefficient by fitting. Alternatively, a brightness value of the display screen is fixed, and under at least two different grayscale values of the display screen, the light sensing value drop depths and the first screen light leakage values are correspondingly acquired respectively, to obtain the first calibration coefficient by fitting.

In some embodiments, a grayscale value of the display screen is fixed, and under different brightness values of the display screen, the light sensing value drop depths and the first screen light leakage values are correspondingly acquired respectively, to obtain a mapping relationship between the light sensing value drop depths and the first screen light leakage values under the grayscale value by fitting. Then, a brightness value of the display screen is fixed, and under different grayscale values of the display screen, the light sensing value drop depths and the first screen light leakage values are correspondingly acquired respectively, to obtain a mapping relationship between the light sensing value drop depths and the first screen light leakage values under the brightness value by fitting. The first calibration coefficient is obtained according to the mapping relationships between the light sensing value drop depths and the first screen light leakage values under the brightness values and the grayscale values.

In some embodiments, during specific implementation, the first calibration coefficient $k_1$ may be determined with the following steps.

In step S2031a, 0 brightness value and 0 grayscale value of the display screen are initialized, and a mapping $K_{00}$ between the light sensing value drop depth and the first screen light leakage value when the brightness value and the grayscale value of the display screen are both 0 is acquired.

First of all, the 0 brightness value of the display screen may be set in a darkroom environment; when the display screen emits only background light, the 0 grayscale value of the display screen is set. Then, within a dimming cycle of the display screen, when the brightness value and the grayscale value of the display screen are both 0 and the display screen driving waveform is located in the non-drop zone and the drop zone, a light sensing value sensed by the sensor is correspondingly collected, a light sensing value drop depth is calculated, a first screen light leakage value is detected, and then a mapping between the light sensing value drop depth and the first screen light leakage value is obtained, denoted as $K_{00}$. $K_{00}$ is configured to represent a mapping between the light sensing value drop depth and the first screen light leakage value when the brightness value and the grayscale value of the display screen are both 0.

In step S2032a, a brightness value of the display screen is fixed, other grayscale values are set by traversal, and a mapping $K_m$ between the light sensing value drop depth and the first screen light leakage value under each grayscale value is acquired.

The brightness value of the display screen is fixed, grayscale values (for example, from 1 to 255) are set by traversal, and a mapping between the light sensing value drop depth and the first screen light leakage value under each grayscale value is correspondingly calculated, which may be denoted as $K_{m1}$, $K_{m2}$, ..., $K_{mm}$ (m=1,2 ..., 255; n=1,2 ..., 255) respectively. m denotes any brightness value of the display screen, and n denotes any grayscale value of the display screen, from which the mapping $K_m$ between the light sensing value drop depth and the first screen light leakage value when the brightness value of the display screen is m may be obtained by fitting.

In step S2033a, a grayscale value of the display screen is fixed, other brightness values are set by traversal, and a mapping $K_n$ between the light sensing value drop depth and the first screen light leakage value under each brightness value is acquired.

The grayscale value of the display screen is fixed, brightness values (for example, from 1 to 255) are set by traversal, and a mapping between the light sensing value drop depth and the first screen light leakage value under each brightness value is correspondingly calculated, which may be denoted as $K_{1n}$, $K_{2n}$, ..., $K_{mn}$ (m=1, 2 ..., 255; n=1, 2 ..., 255) respectively, from which the mapping $K_n$ between the light sensing value drop depth and the first screen light leakage value when the grayscale value of the display screen is n may be obtained by fitting.

If only step S2031a and step S2032a are performed or only step S2031a and step S2033a are performed, the mapping relationship between the light sensing value drop depth and the first screen light leakage value obtained by fitting may be a linear relationship or a polynomial relationship (e.g., $K_m$ or $K_n$). If step S2031a, step S2032a and step S2033a are performed and the light sensing value drop depths and the first screen light leakage values under the brightness values and the grayscale values are obtained, the mapping relationships between the light sensing value drop depths and the first screen light leakage values obtained by fitting may be represented in a form of a matrix (e.g., $[K_{mn}]$).

The first calibration coefficient $k_1$ may be correspondingly obtained based on the mapping between the light sensing value drop depth and the first screen light leakage value.

In step S204a, the ambient light sensing value is calculated based on the first light sensing value Rawdata1, the light sensing value drop depth Raw_depth and the first calibration coefficient $k_1$.

As can be known from step S202, the light sensing value drop depth Raw_depth=the first light sensing value Rawdata1–the second light sensing value Rawdata2=(the first screen light leakage value $L_1$+the ambient light sensing value A)–(the second screen light leakage value $L_2$+the ambient light sensing value A)=the first screen light leakage value $L_1$–the second screen light leakage value $L_2$, that is, Raw_depth=Rawdata1–Rawdata2=($L_1$+A)–($L_2$+A)=$L_1$–$L_2$.

As can be seen from the formula of the light sensing value drop depth, the light sensing value drop depth Raw_depth is only correlated with the light leakage values ($L_1$ and $L_2$) of the display screen, but is not correlated with the ambient light sensing value A. Therefore, after the first calibration coefficient $k_1$ is acquired, an actual light leakage value when the display screen is in the on state may be accurately calculated by detecting a light sensing value drop depth Raw_depth in an actual application scenario. That is, a calibrated first screen light leakage value $L_1'$ is obtained. The calibrated first screen light leakage value $L_1'$ is equal to the light sensing value drop depth Raw_depth multiplied by the first calibration coefficient $k_1$ ($L_1'$=Raw_depth*$k_1$). Finally, the ambient light sensing value A may be accurately calculated by subtracting the calibrated first screen light leakage value $L_1'$ from the first light sensing value Rawdata1. That is, A=Rawdata1–$L_1'$=Rawdata1–Raw_depth*$k_1$.

Alternatively, subsequent to step S202a, step S203b is performed, in which a second calibration coefficient $k_2$ is acquired. The second calibration coefficient k2 may be configured to calibrate a mapping relationship between the light sensing value drop depth Raw_depth and the second screen light leakage value $L_2$ to obtain the calibrated second screen light leakage value $L_2'$.

In some embodiments, a grayscale value of the display screen is fixed, and under at least two different brightness values of the display screen, the light sensing value drop depths and the second screen light leakage values are correspondingly acquired respectively, to obtain the second calibration coefficient by fitting. Alternatively, a brightness value of the display screen is fixed, and under at least two different grayscale values of the display screen, the light sensing value drop depths and the second screen light leakage values are correspondingly acquired respectively, to obtain the second calibration coefficient by fitting.

In some embodiments, a grayscale value of the display screen is fixed, and under different brightness values of the display screen, the light sensing value drop depths and the second screen light leakage values are correspondingly acquired respectively, to obtain a mapping relationship between the light sensing value drop depths and the second screen light leakage values under the grayscale value by fitting. Then, a brightness value of the display screen is fixed, and under different grayscale values of the display screen, the light sensing value drop depths and the second screen light leakage values are correspondingly acquired respectively, to obtain a mapping relationship between the light sensing value drop depths and the second screen light leakage values under the brightness value by fitting. The second calibration coefficient is obtained according to the mapping relationships between the light sensing value drop depths and the second screen light leakage values under the brightness values and the grayscale values.

The second calibration coefficient $k_2$ may be pre-determined with a calibration method. The mapping relationship between the light sensing value drop depth and the second screen light leakage value may be a linear relationship or a polynomial relationship, or represented in a form of a matrix or a lookup table.

In some embodiments, during specific implementation, the second calibration coefficient $k_2$ may be determined with steps similar to the steps for determining the first calibration coefficient $k_1$, including the following steps.

In step S2031b, 0 brightness value and 0 grayscale value of the display screen are initialized, and a mapping between the light sensing value drop depth and the second screen light leakage value when the brightness value and the grayscale value of the display screen are both 0 is acquired.

In step S2032b, a brightness value of the display screen is fixed, other grayscale values are set by traversal, and a mapping $K_m$ between the light sensing value drop depth and the second screen light leakage value under each grayscale value is acquired.

In step S2033b, a grayscale value of the display screen is fixed, other brightness values are set by traversal, and a mapping $K_n$ between the light sensing value drop depth and the second screen light leakage value under each brightness value is acquired.

If only step S2031b and step S2032b are performed or only step S2031b and step S2033b are performed, the mapping relationship between the light sensing value drop depth and the first screen light leakage value obtained by fitting may be a linear relationship or polynomial relationship. If step S2031b, step S2032b and step S2033b are performed and the light sensing value drop depths and the second screen light leakage values under the brightness values and the grayscale values are obtained, the mapping relationships between the light sensing value drop depths and the second screen light leakage values obtained by fitting may be represented in a form of a matrix.

The second calibration coefficient $k_2$ may be correspondingly obtained based on the mapping between the light sensing value drop depth and the second screen light leakage value.

In step S204b, the ambient light sensing value is calculated based on the second light sensing value Rawdata2, the light sensing value drop depth Raw_depth and the second calibration coefficient $k_2$.

Similarly, as can be known from step S202, the light sensing value drop depth Raw_depth=the first light sensing value Rawdata1−the second light sensing value Rawdata2= (the first screen light leakage value $L_1$+the ambient light sensing value A)−(the second screen light leakage value $L_2$+the ambient light sensing value A)=the first screen light leakage value $L_1$−the second screen light leakage value $L_2$.

As can be seen from the expression of the light sensing value drop depth, the light sensing value drop depth Raw_depth is only correlated with the light leakage values ($L_1$ and $L_2$) of the display screen, but is not correlated with the ambient light sensing value A. Therefore, after the second calibration coefficient $k_2$ is acquired, an actual light leakage value when the display screen is in the off state may be accurately calculated by detecting a light sensing value drop depth Raw_depth in an actual application scenario. That is, a calibrated second screen light leakage value $L_2'$ is obtained. The calibrated second screen light leakage value $L_2'$ is equal to the light sensing value drop depth Raw_depth multiplied by the second calibration coefficient $k_2$ ($L_2'$=Raw_depth*$k_2$). Finally, the ambient light sensing value A may be accurately calculated by subtracting the calibrated second screen light leakage value $L_2'$ from the second light sensing value Rawdata2. That is, A=Rawdata2−$L_2'$=Rawdata2−Raw_depth*$k_2$.

In the method for detecting ambient light sensing value according to the embodiments of the present disclosure, a light sensing value drop depth and a first calibration coefficient or a second calibration coefficient are acquired, so that a light leakage value of the display screen can be accurately acquired, thereby effectively eliminating the influence of light leakage of the display screen on ambient light detection and accurately calculating an actual ambient light sensing value without acquiring screen content, which can effectively reduce the system load, save power consumption, protect user privacy and personal information. Moreover, the detection of the ambient light sensing value has high real-time performance and a high response speed.

At least one ambient light sensing value may be correspondingly obtained by triggering each VSync signal, and the light sensing value drop depth is less affected by ambient light. Therefore, ambient light sensing values corresponding to at least two VSync signals are superimposed, and an average ambient light sensing value is calculated, which can effectively eliminate the influence caused by ambient light fluctuation, improve a signal-to-noise ratio and reduce power frequency interference.

Figure 5:
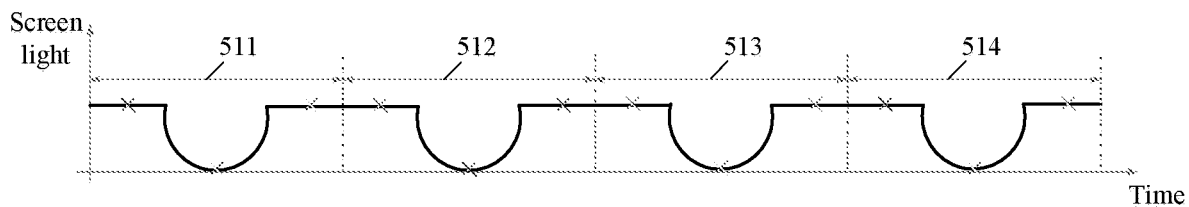
FIG. 5 is a schematic diagram of display screen driving waveforms corresponding to a plurality of VSync signals according to an embodiment of the present disclosure.

FIG. 5 is a schematic diagram of display screen driving waveforms corresponding to a plurality of VSync signals according to an embodiment of the present disclosure. An ambient light sensing value $A_1$, an ambient light sensing value $A_2$, an ambient light sensing value $A_3$ and an ambient light sensing value $A_4$ may be correspondingly detected by triggering a VSync signal 511, a VSync signal 512, a VSync signal 513 and a VSync signal 514, and an average ambient light sensing value $\overline{A}$ may be calculated by superimposing and averaging the above four ambient light sensing values, that is, $\overline{A}=(A_1+A_2+A_3+A_4)/4$.

An embodiment of the present disclosure provides an electronic device, including: a display screen, a sensor, a memory and a processor. The sensor is located below the display screen. The sensor is configured to sense a light sensing value. The memory is configured to store computer execution instructions. The processor is configured to execute the computer execution instructions stored in the memory. When the computer execution instructions are executed, the processor is configured to perform the method for detecting ambient light sensing value.

For example, the electronic device may be a mobile device such as a mobile phone or a tablet computer, or a wearable device such as a smart watch or a smart bracelet.

The memory may be a volatile memory (VM) such as a random access memory (RAM), or a non-volatile memory (NVM) such as a hard disk drive (HDD) or a solid state drive (SSD), or a circuit or any other apparatus that can realize a storage function. The memory 201 may be any other storage media that can store or carry desired program code in a form of instructions or data structures and can be accessed by a computer, which is not limited thereto.

The processor may be a general-purpose processor (such as a microprocessor), a digital signal processor, a special-purpose integrated circuit, a transistor logic device, a field programmable gate array or any other programmable logic devices, which is not limited thereof, and may implement or perform the methods, steps and logic block diagrams according to the embodiments of the present disclosure. The methods and steps provided with reference to the embodiments of the present disclosure may be directly performed by a hardware processor, or may be performed using a combination of hardware and software modules in the processor.

An embodiment of the present disclosure provides a computer-readable storage medium. The computer-readable storage medium stores computer execution instructions. The computer execution instructions are executed by a processor to perform the method for detecting ambient light sensing value.

The computer-readable storage medium may be any usable medium accessible to a computer, or a data storage device such as a server or a data center integrating one or more usable media. The usable medium may be a magnetic medium (for example, a hard disk, a floppy disk, or a magnetic tape), a semiconductor medium (for example, an SSD), an optical medium (for example, a digital video disc (DVD)), and is not limited thereto.

It should be understood that specific embodiments of the present disclosure are only intended to help those skilled in the art better understand the concept of the present disclosure, but not to limit the scope of the present disclosure. Those skilled in the art may make various improvements and alternations based on the above embodiments, and these improvements or alternations fall into the protection scope of the present disclosure.

What is claimed is:

1. A method for detecting ambient light sensing value, applied to an electronic device comprising a display screen and a sensor located below the display screen, wherein the method comprises:

collecting a light sensing value sensed by the sensor when the display screen is in an on state, to obtain a first light sensing value; wherein the first light sensing value is a sum of the ambient light sensing value and a first screen light leakage value, and the first screen light leakage value is a light leakage value when the display screen is in the on state;

collecting a light sensing value sensed by the sensor when the display screen is in an off state, to obtain a second light sensing value; wherein the second light sensing value is a sum of the ambient light sensing value and a second screen light leakage value, and the second screen light leakage value is a light leakage value when the display screen is in the off state;

calculating a difference between the first light sensing value and the second light sensing value, to obtain a light sensing value drop depth;

acquiring a first calibration coefficient, wherein the first calibration coefficient is configured to calibrate a mapping relationship between the light sensing value drop depth and the first screen light leakage value;

acquiring a calibrated first screen light leakage value based on the light sensing value drop depth and the first calibration coefficient; and calculating the ambient light sensing value by subtracting the calibrated first screen light leakage value from the first light sensing value.

2. The method for detecting ambient light sensing value according to claim 1, wherein said acquiring a first calibration coefficient further comprises:

fixing a grayscale value of the display screen, and respectively acquiring the light sensing value drop depths and the first screen light leakage values under at least two different brightness values of the display screen, to obtain the first calibration coefficient by fitting.

3. The method for detecting ambient light sensing value according to claim 1, wherein said acquiring a first calibration coefficient further comprises:

fixing a brightness value of the display screen, and respectively acquiring the light sensing value drop depths and the first screen light leakage values under at least two different grayscale values of the display screen, to obtain the first calibration coefficient by fitting.

4. The method for detecting ambient light sensing value according to claim 1, wherein the calibrated first screen light leakage value is equal to a product of the light sensing value drop depth and the first calibration coefficient.

5. The method for detecting ambient light sensing value according to claim 1, wherein the first light sensing value and the second light sensing value are collected respectively within a dimming cycle of the display screen; and the dimming cycle of the display screen comprises: a non-drop period during which the display screen is on and a drop period during which the display screen is off.

6. The method for detecting ambient light sensing value according to claim 1, wherein collection of the first light sensing value and the second light sensing value is triggered based on vertical synchronization (VSync) signals of the display screen.

7. The method for detecting ambient light sensing value according to claim 6, wherein a signal cycle of each of the VSync signals comprises at least one dimming cycle of the display screen.

8. The method for detecting ambient light sensing value according to claim 7, wherein at least one ambient light sensing value is obtained by triggering each of the VSync signals.

9. The method for detecting ambient light sensing value according to claim 8, further comprising: acquiring the ambient light sensing values corresponding to at least two of the VSync signals, and calculating an average value of the acquired ambient light sensing values.

10. A non-transitory computer-readable storage medium storing computer execution instructions thereon, wherein the computer execution instructions are executed by a processor to perform the method for detecting ambient light sensing value according to claim 1.

11. An electronic device, comprising:
a display screen,
a sensor located below the display screen and configured to sense a light sensing value,
a memory configured to store computer execution instructions; and
a processor configured to execute the computer execution instructions stored in the memory;
wherein when the computer execution instructions are executed, the processor is configured to perform a method for detecting ambient light sensing value, and the method comprises:
collecting a light sensing value sensed by the sensor when the display screen is in an on state, to obtain a first light sensing value; wherein the first light sensing value is a sum of the ambient light sensing value and a first screen light leakage value, and the first screen light leakage value is a light leakage value when the display screen is in the on state;
collecting a light sensing value sensed by the sensor when the display screen is in an off state, to obtain a second light sensing value; wherein the second light sensing value is a sum of the ambient light sensing value and a second screen light leakage value, and the second screen light leakage value is a light leakage value when the display screen is in the off state;
calculating a difference between the first light sensing value and the second light sensing value, to obtain a light sensing value drop depth;
acquiring a first calibration coefficient, wherein the first calibration is configured to calibrate a mapping relationship between the light sensing value drop depth and the first screen light leakage value;
acquiring a calibrated first screen light leakage value based on the light sensing value drop depth and the first calibration coefficient; and
calculating the ambient light sensing value by subtracting the calibrated first screen light leakage value from the first light sensing value.

12. The electronic device according to claim 11, wherein said acquiring a first calibration coefficient further comprises:
fixing a grayscale value of the display screen, and respectively acquiring the light sensing value drop depths and the first screen light leakage values under at least two different brightness values of the display screen, to obtain the first calibration coefficient by fitting.

13. The electronic device according to claim 11, wherein said acquiring a first calibration coefficient further comprises:
fixing a brightness value of the display screen, and respectively acquiring the light sensing value drop depths and the first screen light leakage values under at least two different grayscale values of the display screen, to obtain the first calibration coefficient by fitting.

14. The electronic device according to claim 11,
wherein the calibrated first screen light leakage value is equal to a product of the light sensing value drop depth and the first calibration coefficient.

15. A method for detecting ambient light sensing value, applied to an electronic device comprising a display screen and a sensor located below the display screen, wherein the method comprises:
collecting a light sensing value sensed by the sensor when the display screen is in an on state, to obtain a first light sensing value; wherein the first light sensing value is a sum of the ambient light sensing value and a first screen light leakage value, and the first screen light leakage value is a light leakage value when the display screen is in the on state;
collecting a light sensing value sensed by the sensor when the display screen is in an off state, to obtain a second light sensing value; wherein the second light sensing value is a sum of the ambient light sensing value and a second screen light leakage value, and the second screen light leakage value is a light leakage value when the display screen is in the off state;
calculating a difference between the first light sensing value and the second light sensing value, to obtain a light sensing value drop depth;
acquiring a second calibration coefficient, wherein the second calibration coefficient is configured to calibrate a mapping relationship between the light sensing value drop depth and the second screen light leakage value;
acquiring a calibrated second screen light leakage value based on the light sensing value drop depth and the second calibration coefficient; and
calculating the ambient light sensing value by subtracting the calibrated second screen light leakage value from the second light sensing value.

16. The method for detecting ambient light sensing value according to claim 15, wherein said acquiring a second calibration coefficient further comprises:
fixing a grayscale value of the display screen, and respectively acquiring the light sensing value drop depths and the second screen light leakage values under at least two different brightness values of the display screen, to obtain the second calibration coefficient by fitting.

17. The method for detecting ambient light sensing value according to claim 15, wherein said acquiring a second calibration coefficient further comprises:
fixing a brightness value of the display screen, and respectively acquiring the light sensing value drop depths and the second screen light leakage values under at least two different grayscale values of the display screen, to obtain the second calibration coefficient by fitting.

18. The method for detecting ambient light sensing value according to claim 15, wherein the second screen light leakage value is equal to a product of the light sensing value drop depth and the second calibration coefficient.

19. An electronic device, comprising:
a display screen,
a sensor located below the display screen and configured to sense a light sensing value,
a memory configured to store computer execution instructions; and
a processor configured to execute the computer execution instructions stored in the memory;

wherein when the computer execution instructions are executed, the processor is configured to perform the method for detecting ambient light sensing value according to claim 15.

20. A non-transitory computer-readable storage medium storing computer execution instructions thereon, wherein the computer execution instructions are executed by a processor to perform the method for detecting ambient light sensing value according to claim 15.

* * * * *